United States Patent [19]

Van Doorn et al.

[11] Patent Number: 4,948,870

[45] Date of Patent: Aug. 14, 1990

[54] POLYMERIZATION PROCESS

[75] Inventors: Johannes Van Doorn; Arris H. Kramer; Johannes J. Maria Snel, all of Amsterdam, Netherlands

[73] Assignee: Shell Oil Company, Houston, Tex.

[21] Appl. No.: 350,828

[22] Filed: May 12, 1989

[30] Foreign Application Priority Data

May 27, 1988 [NL] Netherlands ................. 8801365

[51] Int. Cl.$^5$ ................................ C08G 67/02
[52] U.S. Cl. ........................... 528/392; 502/162
[58] Field of Search ............................ 528/392

[56] References Cited

U.S. PATENT DOCUMENTS

| | | | |
|---|---|---|---|
| 3,405,193 | 10/1968 | Hata et al. | 260/680 |
| 3,694,412 | 9/1972 | Nozaki | 260/63 CQ |
| 4,687,874 | 8/1987 | Oswald et al. | 568/454 |
| 4,778,876 | 10/1988 | Doyle et al. | 528/392 |
| 4,786,714 | 11/1988 | Drent | 528/392 |
| 4,806,630 | 2/1989 | Drent et al. | 528/392 |
| 4,808,699 | 2/1989 | Van Broekhoven et al. | 528/392 |
| 4,822,871 | 4/1989 | Klingensmith | 528/392 |
| 4,831,114 | 5/1989 | Drent | 528/392 |
| 4,835,250 | 5/1989 | Drent | 528/392 |
| 4,841,020 | 6/1989 | Drent | 528/392 |
| 4,843,145 | 6/1989 | Drent et al. | 528/392 |
| 4,855,399 | 8/1989 | Van Doorn et al. | 528/392 |
| 4,859,764 | 8/1989 | Drent et al. | 528/392 |
| 4,877,861 | 10/1989 | Van Doorn et al. | 528/392 |

FOREIGN PATENT DOCUMENTS

| | | |
|---|---|---|
| 121965 | 10/1984 | European Pat. Off. . |
| 181014 | 5/1986 | European Pat. Off. . |
| 213671 | 3/1987 | European Pat. Off. . |
| 259914 | 3/1988 | European Pat. Off. . |
| 1955664 | 5/1970 | Fed. Rep. of Germany . |
| 80/01690 | 8/1980 | PCT Int'l Appl. . |

*Primary Examiner*—Earl Nielsen
*Attorney, Agent, or Firm*—Dean F. Vance

[57] ABSTRACT

Linear alternating polymers of carbon monoxide and at least one ethylenically unsaturated hydrocarbon are produced in the presence of novel catalyst compositions formed from a palladium salt, the anion of a non-hydrohalogenic acid having a pKa less than 2 and a bidentate ligand having one atom of phosphorous and one atom of sulfur or selenium.

8 Claims, No Drawings

POLYMERIZATION PROCESS

Field of the Invention

This invention relates to a process for the production of linear alternating polymers of carbon monoxide and at least one ethylenically unsaturated hydrocarbon and to certain catalyst compositions employed in the process. More particularly, it relates to a process for the production of such linear alternating polymers in the presence of a bidentate ligand containing phosphorus and sulfur or selenium.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. No. 1,081,304 produced similar polymers of higher carbon monoxide content in the presence of alkylphosphine complexes of palladium as a catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon, often referred to as polyketones or polyketone polymers, has become of greater interest in part because of the greater availability of the polymers. The more recent processes for the production of the polyketone polymers generally involve the use of a catalyst composition formed from a compound of a Group VIII metal selected from palladium, cobalt or nickel, the anion of a non-hydrohalogenic acid having a pKa below about 6, preferably below 2, and a bidentate ligand containing at least one atom of phosphorus, arsenic, antimony or nitrogen. These processes are illustrated by a number of Published European Patent Applications including Nos. 121,965, 181,014, 213,671 and 259,914.

The resulting polyketone polymers are relatively high molecular weight materials having utility a premium thermoplastics in the production of shaped articles such as containers for food and drink and parts and housings for the automotive industry which are produced by methods conventionally employed for thermoplastics, e.g., extrusion, injection molding or thermoforming.

Although for most purposes the use of a catalyst composition as described above results in the efficient production of polyketones, it would be of advantage to provide additional catalyst compositions useful in the production of the polyketone polymers.

SUMMARY OF THE INVENTION

The present invention provides a process for the production of linear alternating polymers of carbon monoxide and at least one ethylenically unsaturated hydrocarbon as well as a novel catalyst composition useful in the process. More particularly, the present invention relates to a catalyst composition formed from a compound of palladium, the anion of certain strong acids and a bidentate ligand having one atom of phosphorus and one atom of sulfur or selenium.

DESCRIPTION OF THE INVENTION

The polymers which are produced by the process of the invention are the linear alternating polymers of carbon monoxide and at least one ethylenically unsaturated hydrocarbon which are often referred to as polyketones or polyketone polymers. The ethylenically unsaturated hydrocarbons which are useful as precursors of the polyketone polymers have up to 20 carbon atoms inclusive, preferably up to 10 carbon atoms, and are aliphatic such as ethylene and other alpha-olefins such as propylene, 1-butene, isobutylene, 1-octene and 1-dodecene, or are arylaliphatic having an aryl substituent on an otherwise aliphatic molecule, particularly an aryl substituent on a carbon atom of the ethylenic unsaturation. Examples of this latter class of ethylenically unsaturated hydrocarbons are styrene, p-methylstyrene, p-ethylstyrene and m-isopropylstyrene. Preferred polyketone polymers are copolymers of carbon monoxide and ethylene or are terpolymers of carbon monoxide, ethylene and a second hydrocarbon of at least 3 carbon atoms, particularly an alpha-olefin such as propylene.

When the preferred terpolymers of carbon monoxide, ethylene and a second hydrocarbon are produced, there will be at least about 2 units incorporating a moiety of ethylene for each unit incorporating a moiety of the second hydrocarbon. Preferably there will be from about 10 units to about 100 units incorporating a moiety of ethylene for each unit incorporating a moiety of the second hydrocarbon. The polymer chain of the preferred polymers is therefore represented by the following repeating formula

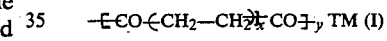 TM (I)

wherein D is a moiety of the second hydrocarbon polymerized through the ethylenic unsaturateion thereof. The —CO—(—CH₂—)—CH₂ units and the —CO—(—D—)— units are found randomly throughout the polymer chain and the ratio of y:x is no more than about 0.5. In the modification wherein copolymers are produced, i.e., there will be no second hydrocarbon present, the polymer will be represented by the above formula I wherein y is 0. In the modification where y is other than 0, i.e., terpolymers are produced, the ratio of y:x will preferably be from about 0.01 to about 0.1. The end groups or "caps" of the polymer chain will depend upon what materials are present during polymerization and how or whether the polymer has been purified. The precise nature of the end groups is of little significance so far as the overall properties of the polymer are concerned so that the polymers are fairly represented by the polymer chain as depicted above.

Of particular interest ar the polyketone polymers of the above formula having a molecular weight of from about 1000 to about 200,000, particularly those of molecular weight from about 10,000 to about 50,000. The physical properties of the polymers will depend in part upon the molecular weight of the polymer, whether the polymer is a copolymer or a terpolymer and, in the case of terpolymers, the relative proportion of the second hydrocarbon. Typical melting points of such polymers are from about 175° C. to about 250° C., particularly from about 210° C. to about 270° C.

The polymers are produced in the presence of a catalyst composition formed from a compound of palladium, the anion of a non-hydrohalogenic acid having a pKa less than 2 and a bidentate ligand having one atom of phosphorus and one atom of sulfur or selenium.

The palladium compound useful as a precursor of the catalyst compositions of the invention is a palladium salt. Palladium carboxylates having up to 10 carbon atoms in each carboxylate moiety are satisfactory, e.g., palladium acetate, palladium propionate, palladium hexanoate and palladium decenoate. Palladium acetate is a particularly preferred palladium compound. The anion precursor of the catalyst composition is the anion of a non-hydrohalogenic acid having a pKa less than 2. Suitable acids are exemplified by inorganic acids such as sulfuric acid or perchloric acid and by organic acids including carboxylic acids such as trifluoroacetic acid and trichloroacetic acid as well as sulfonic acids such as p-toluenesulfonic acid, methanesulfonic acid and trifluoromethanesulfonic acid. The acids trifluoroacetic acid and p-toluenesulfonic acid are preferred sources of the anion precursor of the catalyst composition. The anion is typically employed in the formation of the catalyst composition in a quantity of from about 0.5 equivalent to about 50 equivalents per mol of palladium (as the metal). The preferred quantity of the anion is from about 1 equivalent to about 25 equivalents of anion per mol of palladium. The anion is preferably provided as the acid, but in an alternate modification the anion is provided in the form of a salt, preferably a non-noble transition metal salt and particularly a copper salt. It is also useful on occasion to provide the palladium and the anion as a single compound, for example, as palladium p-toluenesulfonate or acetonitrile complexes thereof.

The bidentate ligand employed in the formation of the catalyst compositions contain one atom of phosphorus and one atom of sulfur or selenium. From one point of view, the ligand can be visualized as the ligand obtained when one aryl group of a triarylphosphine is replaced by a sulfur or selenium containing substituent. The preferred bidentate ligands of one phosphorus and one sulfur or selenium atom are represented by the formula

(II)

wherein R independently is aryl having up to 10 carbon atoms inclusive and is hydrocarbyl or is substituted hydrocarbyl wherein any non-hydrocarbyl substituents are lower alkoxy of up to 4 carbon atoms and preferably methoxy. Preferred R groups are phenyl or alkoxyphenyl wherein at least one alkoxy is located on a ring carbon atom which is ortho to the carbon through which the R group is connected to the remainder of the molecule. Particularly preferred as the R group is phenyl or o-methoxyphenyl. R″ is alkyl of up to 10 carbons inclusive, e.g., methyl, ethyl, propyl, hexyl or decyl, or is R. The preferred R″ is R. The term R′ is a divalent hydrocarbyl bridging group of up to 10 carbon atoms inclusive with from 2 to 4 carbon atoms inclusive in the bridge between the phosphorus and the M atoms. The preferred R′ group is 1,3-propylene, or trimethylene, i.e., the —CH$_2$—CH$_2$—CH$_2$— group. The M moiety is sulfur or selenium, preferably sulfur.

Illustrative of suitable bidentate ligands are 1-diphenylphosphino-3-phenylthiopropane, 1-diphenylphosphino-3-phenylselenopropane, 1-diphenylphosphino-3-methylthiopropane, 1-diphenylphosphino-3-(2-methoxyphenyl)thiopropane and 3-di(2-methoxyphenyl)phosphino-3-(2-methoxyphenyl)thiopropane.

To form the catalyst compositions of the invention, the ligand is used in a quantity of from about 0.5 mol to about 2 mol per mol of palladium. The preferred quantity of ligand is from about 0.75 mol to about 1.5 mol of ligand per mol of palladium.

It is useful on occasion in order to promote the activity of the catalyst compositions to additionally add an organic oxidant and oxidants such as organic nitrite and nitro compounds or quinones are suitable for that purpose. The quinones of up to 10 carbon atoms inclusive are particularly satisfactory, e.g., benzoquinones, naphthoquinones and anthraquinones. Particularly useful are 1,4-quinones, especially 1,4-benzoquinone. The use of an organic oxidant is not required, of course, but if an oxidant is to be used amounts of oxidant up to about 10,000 mol of oxidant per mol of palladium are satisfactory. When oxident is utilized, amounts from about 10 mol to about 50 mol per mol of palladium are preferred.

The quantity of catalyst composition to be used is sufficient to provide from about $1 \times 10^{-7}$ mol to about $1 \times 10^{-3}$ mol of palladium per mol of ethylenically unsaturated hydrocarbon to be polymerized. Preferably, the amount of catalyst composition is sufficient to provide from about $1 \times 10^{-6}$ mol to about $1 \times 10^{-4}$ mol of palladium per mole of ethylenically unsaturated hydrocarbon. The molar ratio of total ethylenically unsaturated hydrocarbon to carbon monoxide in the mixture to be polymerized is from about 10:1 to about 1:5 but preferably is from about 5:1 to about 1:2.

The polymerization process is conducted in the presence of a reaction diluent. Suitable reaction diluents are liquid under the conditions at which the polymerization takes place and are inert towards the reactants and catalyst composition. Such diluents include the alkanols, preferably the lower alkanols such as methanol, ethanol or butanol, and the alkyl ketones such as acetone and methyl ethyl ketone. Also suitable are mixtures of such diluents with other materials including N-alkylamides such as N,N-dimethylformamide and N-methyl-2-pyrrolidone. The carbon monoxide, ethylenically unsaturated hydrocarbon, catalyst composition and reaction diluent are charged to a suitable reactor and maintained under polymerization conditions. The shape or type of the reactor is not critical although best results are obtained when the reactor provides for reactant/catalyst composition contact as by shaking or stirring.

Illustrative polymerization conditions include polymerization temperatures of from about 40° C. to about 120° C. with polymerization temperatures from about 50° C. to about 100° C. being preferred. Useful polymerization pressures are from about 20 bar to about 150 bar, preferably from about 30 bar to about 100 bar. Subsequent to the desired polymerization period, the reaction is terminated by cooling the reactor and releasing the pressure. The polymer product is typically insoluble and is recovered by conventional methods such as filtration or decantation. The polymer is used as recovered or is purified, if desired, as by contact with a solvent or complexing agent which is selective for the catalyst composition residues.

The product is a thermoplastic polymer and is processed into shaped articles by procedures which are conventional for thermoplastic polymers. Such objects include sheets, wires and cables, films useful in packaging operations, containers for food and drink and parts and housings for the automotive industry.

The invention is further illustrated by the following Comparative Examples (not of the invention) and the Illustrative Embodiments which should not be construed as limiting the invention. In each case the polymer product was found by $^{13}$C—NMR analysis to be a linear alternating copolymer of carbon monoxide and ethylene.

COMPARATIVE EXAMPLE I

A copolymer of carbon monoxide and ethylene was prepared by charging to an autoclave of 250 ml capacity maintained at 70° C. a catalyst composition solution comprising 100 ml of methanol, 0.1 mmol of palladium acetate, 2 mmol of trifluoroacetic acid and 0.1 mmol of triphenylphosphine. Ethylene was added to the autoclave until a pressure of 20 bar was reached and carbon monoxide was added until a pressure of 40 bar was reached. After 1 hour the polymerization was terminated by cooling the autoclave and contents to room temperature and releasing the pressure. The polymer product was recovered by filtration, washed with methanol and dried at 60° C. The yield of copolymer was 10 mg.

COMPARATIVE EXAMPLE II

Diphenylphosphino-N,N-dimethylthioacetamide was prepared by the reaction of N,N-dimethylthioacetamide with lithium diisopropylamide, followed by reaction of the lithio-N,N-dimethylthioacetamide thereby obtained with diphenylchlorophosphine.

A copolymer of carbon monoxide and ethylene was produced by a procedure substantially similar to that of Comparative Example I except that 0.1 mmol of diphenylphosphino-N,N-dimethylthioacetamide was used instead of the triphenylphosphine. The yield of copolymer was 100 mg.

ILLUSTRATIVE EMBODIMENT I

The compound 1-diphenylphosphino-3-phenylthiopropane was prepared by reacting diphenyl disulfide with sodium and reacting the sodium thiophenoxide thereby obtained with 1-diphenylphosphino-3-chloropropane.

A carbon monoxide/ethylene copolymer was produced by a procedure substantially similar to that of Comparative Example I except that 0.1 mmol of 1-diphenylphosphino-3-phenylthiopropane was employed instead of triphenylphosphine. The yield of copolymer was 100 mg.

ILLUSTRATIVE EMBODIMENT II

A copolymer of carbon monoxide and ethylene was produced by a procedure substantially similar to that of Illustrative Embodiment I except that the catalyst composition contained 2 mmol of p-toluene sulfonic acid instead of trifluoroacetic acid. The yield of copolymer was 200 mg.

ILLUSTRATIVE EMBODIMENT III

A copolymer of carbon monoxide and ethylene was produced by a procedure substantially similar to that of Illustrative Embodiment II except that the catalyst composition solution additionally contained 10 mmol of 1,4-benzoquinone. The yield of copolymer was 100 mg.

ILLUSTRATIVE EMBODIMENT IV

A carbon monoxide/ethylene copolymer was produced by a procedure substantially similar to that of Illustrative Embodiment I except that the catalyst composition solution contained 2 mmol of trifluoromethanesulfonic acid instead of trifluoroacetic acid. The yield of copolymer was 300 mg.

ILLUSTRATIVE EMBODIMENT V

A copolymer of carbon monoxide and ethylene was produced by a procedure substantially similar to that of Illustrative Embodiment I except that the catalyst composition solution additionally contained 1 ml of nitrobenzene. The yield of copolymer was 100 mg.

ILLUSTRATIVE EMBODIMENT VI

A copolymer of carbon monoxide and ethylene was produced by a procedure substantially similar to that of Illustrative Embodiment I except that the catalyst composition solution contained 75 ml of methanol and 25 ml of N-methyl-2-pyrrolidone instead of 100 ml of methanol. The yield of copolymer was 100 mg.

ILLUSTRATIVE EMBODIMENT VII

The compound 1-diphenylphosphino-3-methylthiopropane was produced by the reaction of dimethyl disulfide with sodium followed by reaction of the sodium methyl sulfide thereby obtained with 1-diphenylphosphino-3-chloropropane.

A copolymer of carbon monoxide and ethylene was produced by a procedure substantially similar to that of Comparative Example I except that the catalyst composition contained 0.1 mmol of 1-diphenylphosphino-3-methylthiopropane instead of the triphenylphosphine. The yield of copolymer was 200 mg.

ILLUSTRATIVE EMBODIMENT VIII

The compound 1-diphenylphosphino-3-(2-methoxyphenyl)thiopropane was produced by the reaction of 2-lithioanisole with sulfur followed by the reaction of the lithium 2-methoxyphenyl sulfide thereby produced with 1-diphenylphosphino-3-chloropropane.

A carbon monoxide/ethylene copolymer was produced by a procedure substantially similar to that of Comparative Example I except that the catalyst composition solution contained 0.1 mmol of 1-diphenylphosphino-3-(2-methoxyphenyl)thiopropane instead of triphenylphosphine. The yield of copolymer was 200 mg.

ILLUSTRATIVE EMBODIMENT IX

The compound 1-diphenylphosphino-3-phenylselenopropane was prepared by reaction of diphenyl diselenide with sodium followed by reaction of the sodium phenyl selenide thereby obtained with 1-diphenylphosphino-3-chloropropane. chloropropane.

A polymer of carbon monoxide and ethylene was produced by a procedure substantially similar to that of Comparative Example I except that the catalyst composition solution contained 0.1 mmol of 1-diphenylphosphino-3-phenylselenopropane instead of triphenylphosphine. The yield of copolymer was 200 mg.

What is claimed is:

1. In the process of producing linear alternating polymers of carbon monoxide and at least one ethylenically unsaturated hydrocarbon by contacting the carbon monoxide and hydrocarbon under polymerization conditions in the presence of a catalyst composition formed from a palladium compound, the anion of a non-hydrohalogenic acid having a pKa below 2 and a bidentate ligand, the improvement which comprises employing as the bidentate ligand a ligand having one atom of phosphorus and one atom of sulfur or selenium.

2. The process of claim 1 wherein the bidentate ligand is represented by the formula

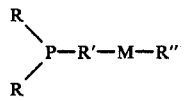

wherein R independently is aryl having up to 10 carbon atoms inclusive, R" is alkyl of up to 10 carbon atoms inclusive or R, R' is a divalent hydrocarbyl bridging group of up to 10 carbons inclusive with from 2 to 4 carbon atoms in the phosphorus-M bridge, and M is sulfur or selenium.

3. The process of claim 2 wherein R is phenyl or o-alkoxyphenyl.

4. The process of claim 3 wherein R" is R.

5. The process of claim 4 wherein R' is trimethylene.

6. The process of claim 5 wherein R is phenyl.

7. The process of claim 5 wherein R is o-methoxyphenyl.

8. The process of claim 5 wherein M is sulfur.